United States Patent
Liikanen

Patent Number: 6,005,740
Date of Patent: Dec. 21, 1999

[54] METHOD AND APPARATUS FOR DEVELOPING POSITION ERROR CURVES FOR MAGNETO-RESISTIVE HEADS

[75] Inventor: Bruce Liikanen, Berthoud, Colo.

[73] Assignee: Maxtor Corporation, Longmont, Colo.

[21] Appl. No.: 08/942,131

[22] Filed: Oct. 1, 1997

[51] Int. Cl.$^6$ .................................................. G11B 5/596
[52] U.S. Cl. ................................ 360/77.08; 360/77.02
[58] Field of Search .......................... 360/77.08, 77.05, 360/77.02, 75

[56] References Cited

U.S. PATENT DOCUMENTS

| | | | |
|---|---|---|---|
| 5,436,773 | 7/1995 | Hanson | 360/66 |
| 5,771,131 | 6/1998 | Pirzadeh | 360/77.08 |
| 5,825,579 | 10/1998 | Cheung et al. | 360/77.08 |
| 5,892,634 | 4/1999 | Ito et al. | 360/77.08 |
| 5,923,492 | 7/1999 | Liikanen | 360/77.08 |

*Primary Examiner*—Aristotelis M. Psitos
*Assistant Examiner*—Dan I. Davidson
*Attorney, Agent, or Firm*—David M. Sigmond

[57] ABSTRACT

A disk having a servo burst pattern used for generating PES curves for MR heads is disclosed. The disk has a plurality of tracks and each of the tracks has a track width. The servo burst pattern includes a first servo burst and a second servo burst forming a first servo burst pair; and, a third servo burst and a fourth servo burst forming a second servo burst pair. The second servo burst pair is circumferentially adjacent to the first servo burst pair. The third servo burst spans a distance of (TW/2+K(TW/2)), while the fourth servo burst spans a distance of ((TW/2+(2−K)(TW/2)). In the above equations, TW equals the track width and 0<K<1. Furthermore, a method of generating a PES curve for a disk drive including an MR head and a magnetic disk having a servo burst pattern written thereon is also disclosed. The method includes the steps of (1) reading servo burst patterns from the magnetic disk, the servo burst patterns including first and second servo bursts which intersect at a first point, the first and second servo burst patterns having a width that is equal to one another, third and fourth servo burst patterns which intersect each other at a second point which is radially between the first point and another track centerline, the third servo burst pattern having a width equal to K(TW/2) and the fourth servo burst pattern having a width equal to (2−K)(TW/2) where 0<K<1 and TW is the track width; (2) centering the MR head at a position between the intersection of first and second servo bursts and intersection of third and fourth servo bursts; and, (3) obtaining a reading from the head after it has been centered.

49 Claims, 5 Drawing Sheets

METHOD AND APPARATUS FOR DEVELOPING POSITION ERROR CURVES FOR MAGNETO-RESISTIVE HEADS

FIELD OF THE INVENTION

The present invention relates to servo-systems for magnetic storage devices and, more particularly, to servo systems for such devices which employ magneto-resistive ("MR") transducer heads.

BACKGROUND OF THE INVENTION

Magnetic heads are used to read data from and write data onto certain data regions of magnetic disks. To accurately perform these operations, it is critical that the heads be properly positioned over the data regions. In an attempt to ensure the proper positioning of the heads relative to the data regions, disk drive manufacturers have resorted to using servo-systems. The servo-systems sense the position of the heads and generate position error ("PES") signals to adjust the position of the heads to their respective proper locations over the magnetic disk. The magnitude of the PES signal varies based upon the distance the heads are from their proper locations. Generally, the greater the magnitude of the PES signal the greater the distance the heads are from their proper locations.

In completely linear systems, a disk drive's servo-system determines the distance and direction a head is to be moved by multiplying a measured PES signal by a constant. In non-linear systems, however, a disk drive's servo system determines which direction and how far to move a head based upon a PES curve which is stored within the servo-system's memory. The establishment of an accurate PES curve is, therefore, critical to the operation of nonlinear systems.

In non-linear systems, a small change in the measured PES signal can cause the servo-system to instruct the head to move great distances. For this reason, small errors in the measured PES signal can cause large errors in the head position. To minimize such large errors, it is desirable to develop PES curves which are relatively linear.

The present invention provides a method and apparatus of developing a relatively linear PES curve for a non-linear system.

Additionally, because PES curves in a non-linear system can vary from head to head based upon varying head widths during their manufacture, it is desirable to develop separate PES curves for each head of a disk drive.

The present invention allows for the development of separate PES curves for each head of a disk drive.

Before continuing, it must be noted that, for the present invention, the term PES signal is defined as the error signal that is used to place the head on or near its proper position (relative to the track centerline) after the head has already been positioned on the proper track (i.e., during track following). In other words, the PES signal as defined herein does not include the coarse positioning information required to position the head on the correct track. Of course, the PES signal as defined herein may be used in combination with the coarse positioning information to properly position the head on the disk.

To properly set forth the background of the invention, a linear disk drive system will now be described and certain conventions will be adopted. Importantly, these conventions will be used with regard to describing the present invention.

A standard disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a head 20 mounted to a flexure arm 22 which is attached to an actuator arm 24 that can rotate about a bearing assembly 26. The actuator arm assembly 18 also contains a voice coil motor 28 which moves the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Referring now to FIG. 2, data is stored on the disk 12 within a number of concentric radial tracks 40 (or cylinders). Some tracks 40 solely contain servo information while other tracks contain both servo information and data. Each track 40 is divided into a plurality of sectors 42. In tracks 40 which contain both servo information and data, each sector 42 is further divided into a servo region 44 and a data region 46.

The servo regions 44 of the disk 12 are used to, among other things, accurately position head 20 (the head 20 is shown in FIG. 1) so that data can be properly written onto and read from the disk 12. The data regions 46 are where non-servo related data (i.e., user data) is stored and retrieved. Such data, upon proper conditions, may be over-written.

Each track 40 has a centerline 48. To accurately write and read data from the data region 46 of the disk 12, it is desirable to maintain the head 20 in a relatively fixed position with respect to a given track's centerline 48 during each of the writing and reading procedures. For simplicity and for purposes of demonstrating the invention, it will be assumed that the head 20 should be positioned on, or substantially on, a given track's centerline 48 to accurately read data from and write data to the data region 46 of that track 40. It should be noted, however, that the invention described herein is equally applicable to those systems which incorporate a read or write offset from the track centerline, as will be understood by those skilled in the art.

To assist in controlling the position of the head 20 relative to the track centerline 48, the servo region 44 contains, among other things, servo information in the form of servo patterns 50 comprised of groups of servo bursts A, B, C, D as shown in FIG. 3. The servo bursts A, B, C, D are accurately positioned relative to the centerline 48 of each track 40, are typically written on the disk 12 during the manufacturing process using a servo track writer ("STW") and, unlike information in the data region 46, may not be over-written or erased during normal operation of the disk drive 10.

As shown in FIG. 3, the A and B burst pairs define what are conventionally known as the Norms. The difference in amplitude between the A and B bursts at a particular head position is defined as the Norms signal (in units of volts) and is represented by N=A−B. A Norms curve can be developed to represent Norms signals for head positions across an entire track.

Likewise, the C and D burst pairs define what are conventionally known as the Quads. The difference in amplitude between the C and D bursts at a particular head position is defined as the Quads signal (in units of volts) and is represented by Q=C−D. A Quads curve can be developed to represent Quads signals for head positions across an entire track.

During the manufacturing process of the disk drive 10, a servo-track writer (not shown) is used to write servo bursts A, B, C, D onto each of the servo regions 44 of the disk 12. As shown in FIG. 3, each track has a track width ("TW") and the distance between each pair of horizontal grid lines represents ½ of a track width (or "TW/2"). Accordingly, each of the servo bursts A, B, C, D depicted in FIG. 3 spans a distance equal to one track width. Additionally, as depicted in FIG. 3, the head 20 has a width approximately equal to one track width.

It should be noted that the term track width, as used in connection with describing the present invention, is defined as two STW step widths, as will be understood by those skilled in the art.

With reference to track n, servo bursts A and B are displaced on either side of the centerline 48 of track n. Both servo bursts A and B "contact" the centerline 48 of track n along one of their "ends." Similarly, servo bursts C and D are displaced on either side of the intersection of track n−1 and track n, which is a half track away from the centerline 48 of track n. Both servo bursts C and D "contact" the intersection of track n−1 and track n along one of their "ends."

Additional groups of servo bursts A, B, C, D (i.e., the servo bursts which correspond with track n+2 and track n+4) are in radial alignment with the group of servo bursts A, B, C, D described in connection with track n, as shown in FIG. 3. Accordingly, each one of the A servo bursts are radially aligned with one another, and radially adjacent A servo bursts are spaced apart by the distance of one track width. For example, servo burst A of track n+2 is in radial alignment with servo burst A of track n and is spaced therefrom by the distance of one track width.

Similarly, all of the B, C and D bursts are respectively radially aligned with one another. Furthermore, radially adjacent B, C and D bursts are respectively spaced apart by the distance of one track width. For example, servo burst B of track n+2 is in radial alignment with servo burst B of track n and is spaced therefrom by the distance of one track width. Likewise, the radial alignment and spacing of corresponding servo bursts C and D follow suit. It should be noted that the space between the servo bursts is not written upon by the servo-track writer.

With reference to FIGS. 1–3, as the head 20 is positioned over a track 40, it reads the servo information contained in the servo regions 44 of the track 40, one servo region 44 at a time. The servo information is used to, among other things, generate PES signals as a function of the misalignment between the head 20 and the track centerline 48. The PES signals are input through a microprocessor which performs calculations and outputs a servo compensation signal which controls the voice-coil motor 28 to place the head 20 over the track centerline 48.

As will be understood by those skilled in the art, because the system shown in FIGS. 1—3 is a linear system, its PES curve is based upon the position of the head 20 with respect to the A and B bursts. More specifically, in such a system, the PES curve is based upon the Norms curve, while the Quads curve is not used for track following.

Referring again to FIG. 3, when the head 20 is positioned exactly over the centerline 48 of track n, one-half of the A burst will be read followed by one-half of the B burst, and their amplitudes will be equal. In such case, the Norms signal will be zero. It follows that the PES signal, because there is no misalignment of the head relative to the track centerline, will also be zero. As the head 20 moves off of the track centerline, the amplitude of one burst will increase while the amplitude of the other burst will decrease, depending on the direction of misalignment. By knowing the amplitude of the Norms signal at different head positions, a Norms curve may be developed.

The Quads curve can be developed in a similar manner. Specifically, if the head 20 is positioned exactly one-half track above the centerline of track n (at the intersection of track n−1 and track n), one-half of the C burst will be read followed by one-half of the D burst. As the head 20 moves off of the intersection of track n−1 and track n, the amplitude of the either the C burst or the D burst will increase while the other will decrease, depending on the direction in which the head 20 is moved.

FIG. 4 shows ideal Norms and Quads curves for the head 20 described in connection with FIG. 3. In FIG. 4, the x-axis is used to record positional distances along the disk 12 and is divided into units of tracks. The y-axis is given in units of volts. As is clear from FIG. 4, the ideal Norms and Quads curves for the head 20 are linear.

In developing the Norms and Quads curves of FIG. 4 using the servo burst patterns of FIG. 3, certain conventions were adopted. First, it was assumed that the disk 12 is rotating in the direction of arrow 100. Second, the head 20 was considered to be moving towards the outer diameter ("OD") of the disk 12 when it moved up the page and towards the inner diameter ("ID") of the disk 12 when it moved down the page (see the appropriate arrows which are labeled ID and OD in FIG. 3). Finally, a track was defined as an Even track if its A burst was on the OD side of the track centerline (for example, tracks n, n+2, n+4, etc.). Conversely, a track was defined as an Odd track if its A burst was on the ID side of the track centerline (for example, tracks n−1, n+1, n+3, etc.). As mentioned above, these conventions will be used in connection with describing the present invention in the section of this document entitled detailed description of the preferred embodiment.

Upon review of FIG. 4, one sees that when head 20 is properly placed over a track centerline, the resulting Norms signal (remember N=A−B) is zero. If the ideal head is slightly off the track centerline of an Even track in a direction towards the OD of the disk, the resulting amplitude of the Norms signal is positive. On the other hand, if the ideal head is slightly off the track centerline of an Even track in a direction towards the ID of the disk, the resulting amplitude of the Norms signal is negative. Conversely, if the ideal head is slightly off the track centerline of an Odd track in a direction towards the OD of the disk, the resulting amplitude of the Norms signal is negative. While if the ideal head is off the track centerline of an Odd track in a direction towards the ID of the disk, the resulting amplitude of the Norms signal is positive.

As far as the Quads signal goes (shown in dotted lines in FIG. 4), its amplitude is zero when the ideal head is a distance of +/−½ track from each track centerline and the absolute value of its amplitude is a maximum when the head is on the track centerline.

Generally, as one can observe from FIG. 4, the Norms curve and the Quads curve are identical in shape but are 90 degrees out of phase from one another. Hence, as will be understood by those skilled in the art, in a situation where the Norms and Quads curves are entirely linear (as shown in FIG. 4), the PES curve can be based entirely upon the Norms curve In other words, the Quads curve is not needed for track following.

In the past, thin-film inductive ("TFI") heads were used to perform both the read and write functions of a disk drive. TFI heads, like the head 20 described in connection with FIGS. 1–4 above, are designed to be one track-width wide and, generally, have a linear response. Therefore, as is understood by those skilled in the art, PES curves for TFI heads are substantially linear and are based upon their Norms curve.

Relatively recently, there has been a trend to use magneto-resistive ("MR") heads instead of TFI heads to perform a disk drive's read functions. One of the main reasons for the switch is due to the greater sensitivity of MR heads over TFI heads. As a result, areal densities have dramatically increased.

MR heads have been designed so that their width is much less than one track-width, usually around a half-track width wide. Unfortunately, however, this has caused the Norms signals associated with MR heads to be, in-part, non-linear.

For example, if an MR head having a width of only a half-track was moved from the track centerline of FIG. 3 upwards slightly more than half a track-width, the head would only be able to read information from the A servo burst, while the information from the B servo-burst would no longer be able to be read. This would cause some non-linearity in the Norms curve and, hence, the PES curve. Therefore, the Norms curve cannot be used, without some manipulation, to develop a PES curve for an MR head.

Additionally, because head widths vary from head-to-head during their manufacture, heads may have Norms curves that look slightly different from one another.

Accordingly, there is a need to develop a relatively linear PES curve which takes the non-linear nature of MR heads into account so that such heads are more accurately positioned over data regions. Also, there is a need to develop a PES curve for each head in a disk drive which contains multiple heads to account for the variations in the widths of the such heads. The present invention, among other things, is designed to meet the aforementioned needs and to overcome the aforementioned problems.

SUMMARY OF THE INVENTION

It is an object of the invention to provide a method and apparatus for developing a relatively linear PES curve for a non-linear system containing MR heads so that such heads may be more accurately positioned over their proper locations.

It is also an object of the present invention to develop PES curves for each head in a disk drive containing a plurality of heads to account for the variations in the widths of such heads.

In accordance with the invention, a disk having a servo burst pattern used for generating PES curves for MR heads is disclosed. The disk has a plurality of tracks and each of the tracks has a track width.

In a preferred embodiment, the servo burst pattern includes a first servo burst and a second servo burst forming a first servo burst pair; and, a third servo burst and a fourth servo burst forming a second servo burst pair. The second servo burst pair is circumferentially adjacent to the first servo burst pair. The third servo burst spans a distance of (TW/2+K(TW/2)), while the fourth servo burst spans a distance of ((TW/2+(2−K)(TW/2)). In the above equations, TW equals the track width and 0<K<1.

A method of generating a PES curve for a disk drive including an MR head and a magnetic disk having a servo burst pattern written thereon is also disclosed. The method includes the steps of (1) reading servo burst patterns from the magnetic disk, the servo burst patterns including first and second servo bursts which intersect at a first point, the first and second servo burst patterns having a width that is equal to one another, third and fourth servo burst patterns which intersect each other at a second point which is radially between the first point and another track centerline, the third servo burst pattern having a width equal to K(TW/2) and the fourth servo burst pattern having a width equal to (2−K)(TW/2) where 0<K<1 and TW is the track width; (2) centering the MR head at a position between the intersection of first and second servo bursts and intersection of third and fourth servo bursts; and, (3) obtaining a reading from the head after it has been centered.

Other objects, features and advantages of the invention will be apparent from the following specification taken in conjunction with the following drawings.

DETAILED DESCRIPTION OF THE PREFERRED EMBODIMENT

Figure 1:
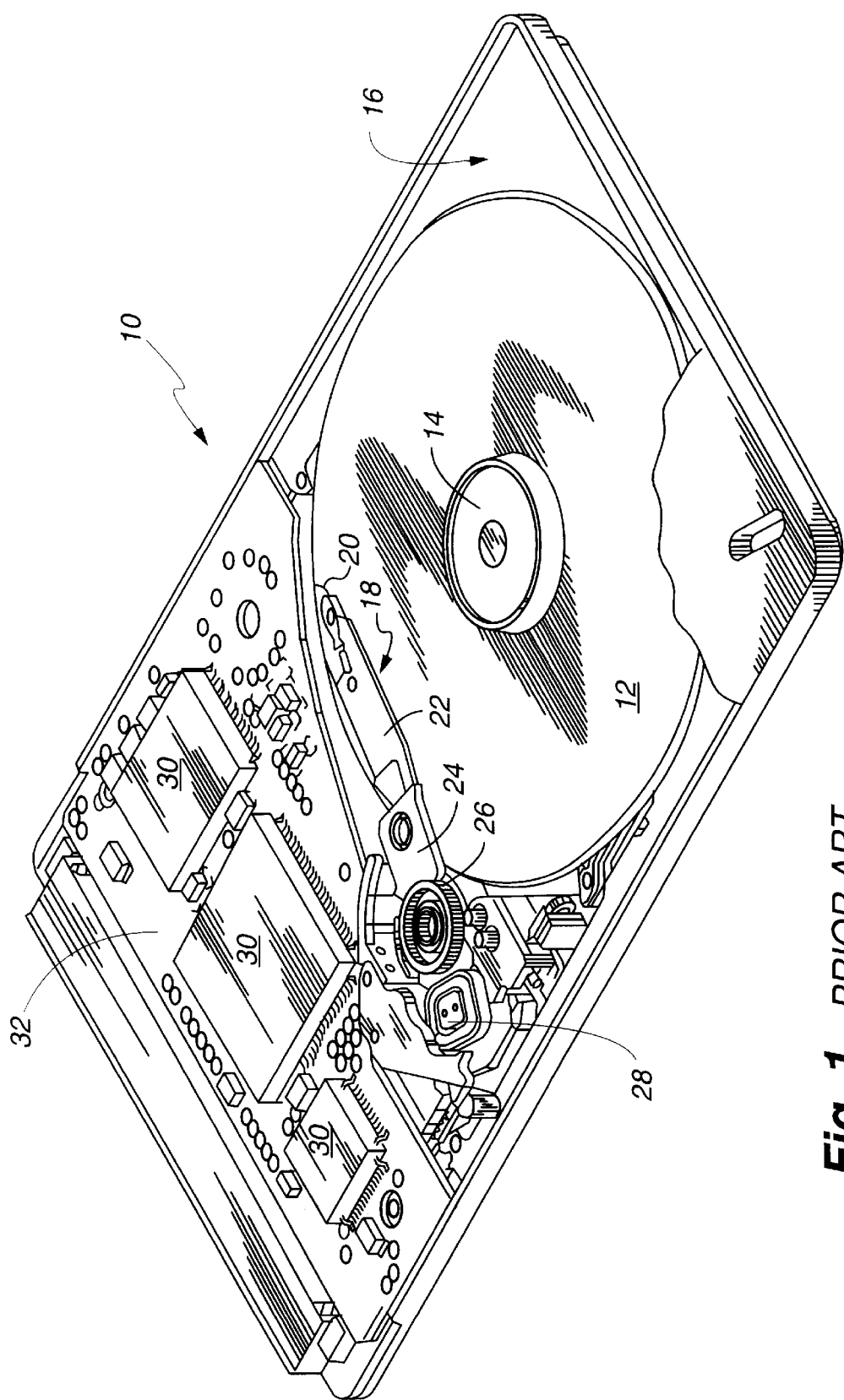
FIG. 1 is a perspective view of a disk drive.
Figure 2:
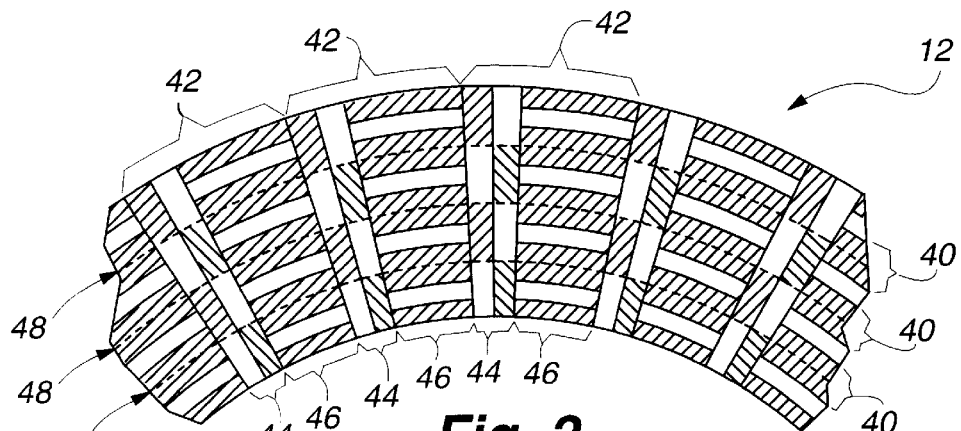
FIG. 2 is a fragmentary diagrammatic representation of a disk identifying, among other things, its tracks and sectors.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The components of a disk drive containing an MR head substantially mirror those of the disk drive 10 of FIG. 1 except that head 20 is an MR head. Generally, disk drives now include a plurality of disks having corresponding MR heads.

Figure 5:
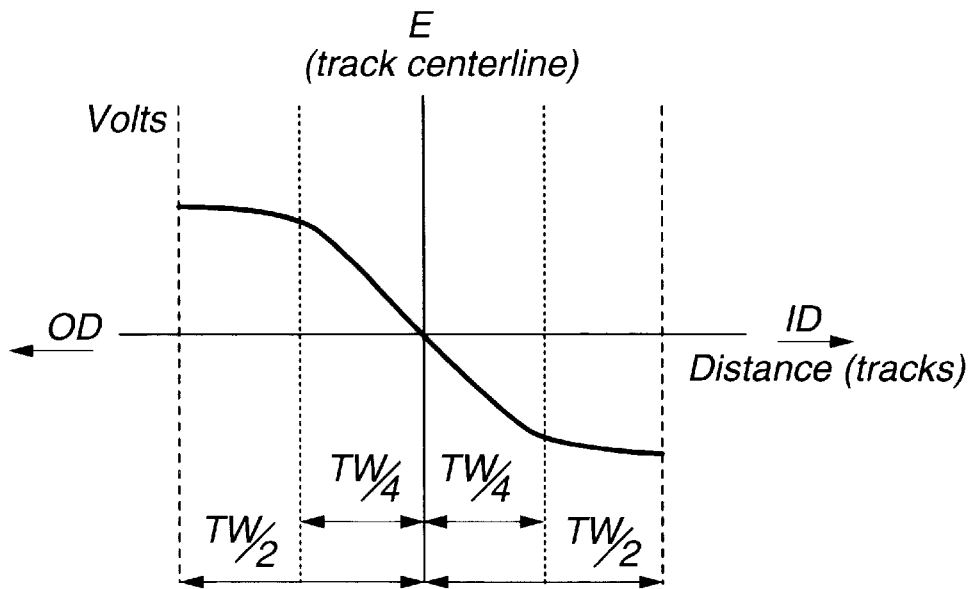
FIG. 5 is a diagrammatic representation of a typical Norms curve for an MR head having units of volts along the y-axis and units of distance (in tracks) along the x-axis.

FIG. 5 shows a Norms curve for a typical MR head. Because the Norms curve is so non-linear (especially at distances further than TW/4 from the track centerline), if one based a PES curve for an MR head on the Norms curve of FIG. 5, there is a strong likelihood that the head 20 would be placed in improper positions since small errors in the measured PES signal could cause large errors in the positioning of the head 20.

As explained below, to overcome this problem, the present invention uses the relatively linear portion of the Norms curve (i.e., the portion of the curve less than TW/4 from the track centerline) and the relatively linear portion of its associated Quads curve to develop a relatively linear PES curve.

Figure 4:
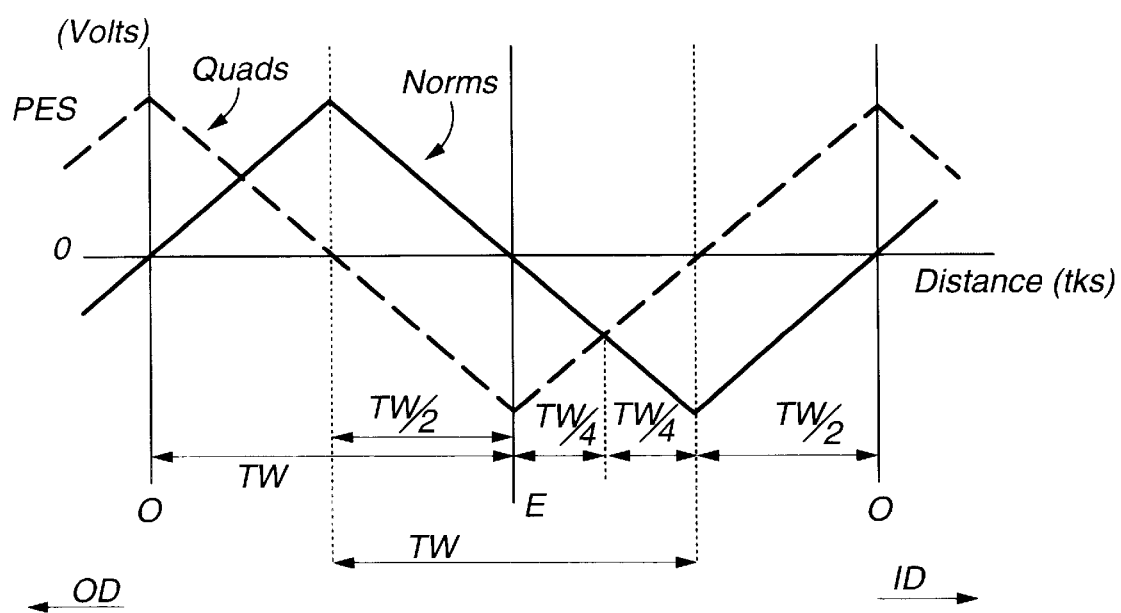
FIG. 4 is a diagrammatic representation of ideal Norms and Quads curves for a linear system.

Again, a typical MR head might have a Norms curve (for an Even track) similar to that shown in FIG. 5 and a Quads curve identical in shape thereto but 90 degrees out of phase therefrom (see, e.g., the relation between the Norms curve and the Quads curve of FIG. 4). The Norms curve is relatively linear at distances less than ¼ of a track width away from the track centerline, but becomes sharply non-linear (with respect to the aforementioned relatively linear portion) at distances greater than ¼ of a track width away from the track centerline. In contrast, the Quads curve (because it is 90 degrees out of phase from the Norms curve), is relatively linear at distances greater than ¼ of a track width away from the track centerline but is non-linear at distance less than ¼ of a track width away from the track centerline.

As will be understood by those skilled in the art, the Norms signal and the Quads signal in a linear system are equal (in magnitude) at a distance of ¼ of a track width away from the track centerline (see FIG. 4). Fortunately, this is approximately true in non-linear systems which contain MR heads. Accordingly, by following the Norms curve at distances less than ¼ of a track width away from the track centerline and following the Quads curve at distances greater than ¼ of a track width away from the track centerline, a relatively linear PES curve may be obtained.

To get the system to properly follow the Norms curve or the Quads curve, first, the Norms signal and the Quads signal must be sensed based upon the position of the head 20 relative to the track centerline. Next, the amplitudes of the Norms signal and the Quads signal must be compared. As can be observed from FIG. 4, for a given track, at distances less than ¼ of a track from the track centerline, the absolute value of the amplitude of the Norms signal is less than the absolute value of the amplitude of the Quads signal. Conversely, for a given track, at distances greater than ¼ of a track from the track centerline, the absolute value of the amplitude of the Quads signal is less than the absolute value of the amplitude of the Norms signal. Accordingly, to follow the linear portion of both the Norms curve and the Quads curve, the Norms voltage signal must be sensed and the Quads voltage signal must be sensed. Their absolute values must then be compared. The system must then generate a PES signal based upon the curve corresponding to the voltage signal having a lower absolute value. In the case where the Quads curve is followed (i.e., the absolute value of the Quads voltage signal is less than the Norms voltage signal), the system automatically adjusts the head position ½ track in the appropriate direction so that the head is placed closer to the track centerline.

Because the curve shown in FIG. 5 may vary for each MR head due to variations in head width and in sensitivity, all of the above is relatively useless unless the shape of the relatively linear portions of the Norms and Quads curves can be accurately determined. Accordingly, the present invention includes a method and apparatus of developing the relatively linear portion of the Norms curve which will be described below. Once the relatively linear portion of the Norms curve is developed, the relatively linear portion of the Quads curve can be developed knowing that it is 90 degrees out of phase from the Norms curve.

By experimentation and visualization of curves similar to that shown in FIG. 5, it has been determined that a common characteristic of the relatively linear portion of Norms curve for nearly all MR heads is that such curves contain third order effects. Another common characteristic is that all of the Norms curves have a Norms signal that equals zero when the head 20 is on the track centerline. Accordingly, the relatively linear portion of the Norms curve for nearly all MR heads must be subject to the following third-order equation ("Equation 1"):

$$Y = Ax + Bx^2 + Cx^3$$

where: Y=track distance (in tracks); A, B and C are constants that need to be solved for; and, x=Norms signal (in volts).

Figure 7:
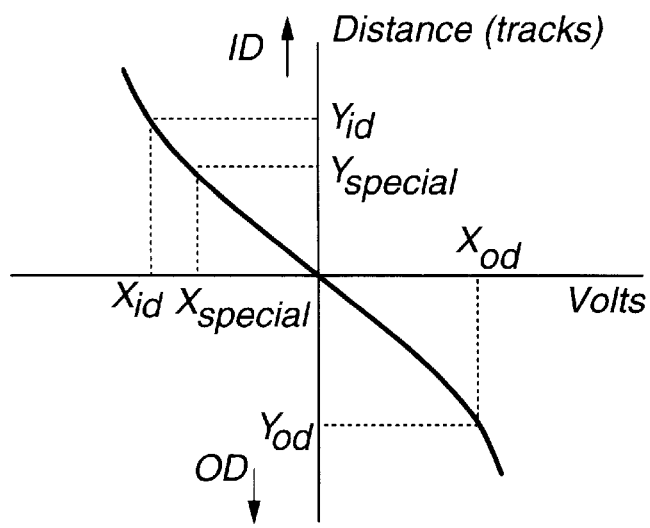

Looking ahead, a curve which satisfies the above equation is shown in FIG. 7. In comparing FIGS. 5 and 7, it is apparent that the curve of FIG. 5 has units of volts along its y-axis and units of distance (in tracks) along its x-axis, while the curve of FIG. 7 has units of distance (in tracks) along its y-axis and units of volts along its x-axis. In order to properly adhere to the conventions adopted in the background of invention section (with regard to ID and OD and the like), the curve of FIG. 5 needs to be "flipped" to arrive at the curve of FIG. 7 as will be understood by those skilled in the art (i.e., the flipping occurs across the y-axis of FIG. 7). Accordingly, for sake of simplicity, the curve of FIG. 7 will be referred to as an "inverted" Norms curve. It should be noted that the "flipping" described above is accounted for in the system's software.

As is well-known, to solve for the three unknown coefficients (A, B and C) in the third order equation set forth above, three equations are required. As is understood by those skilled in the art, three equations can be developed by knowing the values of x and Y at three points on the curve being developed.

Figure 6:
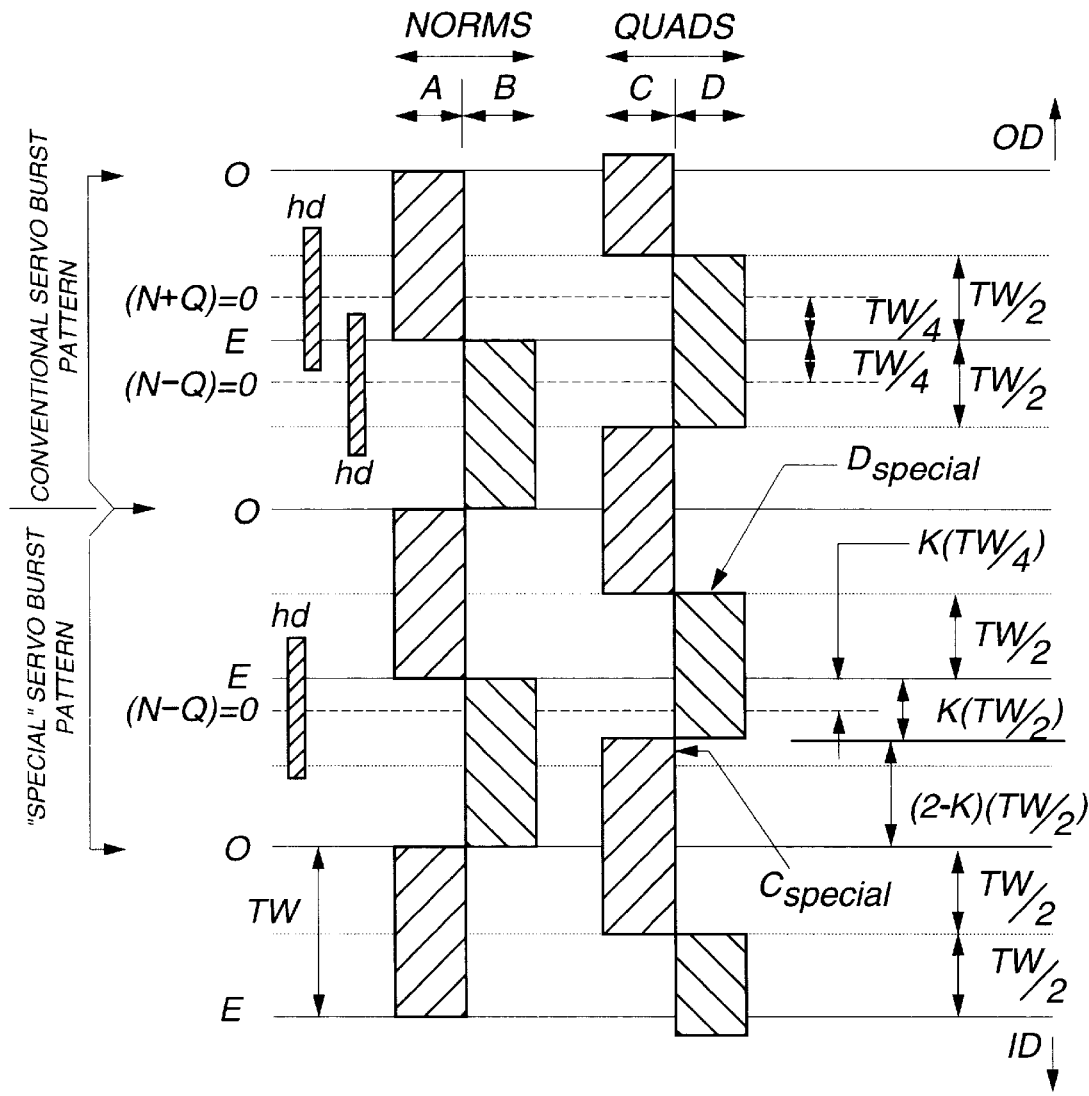
FIG. 6 is a diagrammatic representation of a normal servo burst pattern and a special servo burst pattern used to obtain three points of the Norms curve for an MR head; and, FIG. 7 is a diagrammatic representation of a portion of an "inverted" Norms curve having units of distance (in tracks) along the y-axis and units of volts along the x-axis, said curve being developed by using the normal and special servo burst patterns of FIG. 6.

To obtain the values of three points on the curve, reference is now made to FIG. 6 which shows an Even track having a conventional servo burst pattern (top of the figure) and another Even track having a "special" servo burst pattern (bottom of the figure). Two of the points may be obtained by using the conventional servo burst pattern.

In particular, to obtain the first point, the servo system is directed to place the MR head at a distance of TW/4 towards the OD of the disk with respect to an Even track's centerline. This is accomplished by directing the servo-system to make the aggregate of the Norms and Quads signal equal to zero (i.e., N+Q=0) at an Even track. As shown in FIG. 6, the result is to place the head 20 halfway between the intersection of the A and B servo bursts and the intersection of the C and D servo bursts. The value of the Norms signal is then obtained after the head has been appropriately positioned. In the preferred embodiment, to obtain a good average value of the Norms signal that eliminates noise, the above step is performed on several tracks and for several revolutions (i.e., several sets of Norms and Quads pairs). Thus, the first point of the curve has a distance of TW/4 towards the outer diameter ("OD") and has an average Norms signal at that location. For sake of convenience, the coordinates for the first point will be respectively referred to as $Y_{OD}$ and $x_{OD}$.

To obtain a second point, the servo system is directed to place the MR head at a distance of TW/4 toward the ID of the disk with respect to an Even track's centerline. This is accomplished by directing the servo-system to make the difference between Q and N equal to zero (i.e., N−Q=0) at an Even track. As shown in FIG. 6, the result is to place the head 20 halfway between the intersection of the A and B servo bursts and the intersection of the C and D servo bursts. The value of the Norms signal is then obtained after the head has been appropriately positioned. In the preferred embodiment, to obtain a good average value of the Norms signal that eliminates noise, the above step is performed on several tracks and for several revolutions (i.e., several sets of Norms and Quads pairs). Thus, the second point of the curve has a distance of TW/4 towards the inner diameter and has an average Norms signal at that location. For convenience, the coordinates of the second point will be respectively referred to as $Y_{ID}$ and $x_{ID}$.

To obtain the third point, we must use the special servo burst pattern shown towards the bottom of FIG. 6. Before describing the particulars of obtaining the third point, a discussion of the differences between a conventional servo burst pattern and the special servo burst pattern is necessary.

Figure 3:
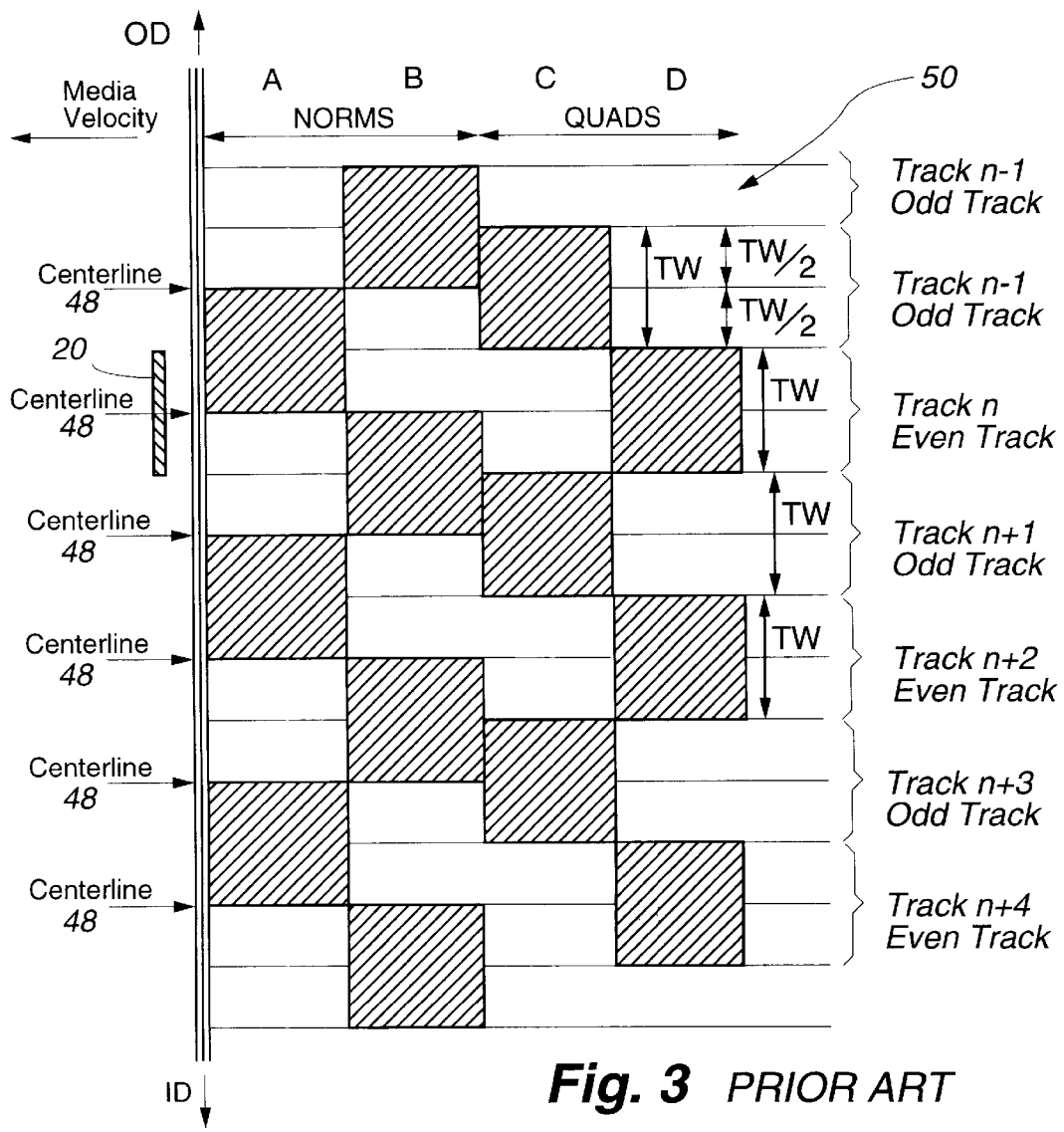
FIG. 3 is a diagrammatic representation of a typical servo-burst pattern.

The servo track writer ("STW") normally writes servo burst patterns like those of FIG. 3 and those identified as conventional servo burst patterns in FIG. 6. Conventional servo burst patterns are written such that each servo burst pair (i.e., A and B pair or C and D pair) spans two track widths. Furthermore, each individual servo burst (i.e., A, B, C or D) spans one track width.

As shown in FIG. 6, to obtain the third point, conventional A and B servo burst pairs are still needed in addition to servo bursts $C_{special}$ and $D_{special}$. As depicted in FIG. 6, $C_{special}$ and $D_{special}$ together still span two track widths, however, each individual servo burst does not span exactly one track width. Specifically, servo burst $C_{special}$ spans a distance of $((TW/2)+(2-K)(TW/2))$ and servo burst $D_{special}$ spans a distance of $((TW/2)+K(TW/2))$, where $0<K<1$.

The combination of the intersection of the A and B servo burst patterns and the intersection of the $C_{special}$ and $D_{special}$ servo burst patterns determines where the head 20 will be positioned to obtain the third point required to solve the third order equation. More specifically, as described in connection with the first and second head positions, the head will be positioned half way between where the A and B bursts intersect one another and where the $C_{special}$ and $D_{special}$ bursts intersect each other (i.e., $K(TW/4)$).

Because the relatively linear section of the Norms curve (the curve that we are ultimately trying to develop) spans from $-TW/4$ to $TW/4$, it is important that the $C_{special}$ and $D_{special}$ servo bursts are chosen so that the head position falls within that range. Indeed, based upon the values of K specified above, the head position does fall within $+/-TW/4$.

For example, if $K=0.70$, the servo system would be directed to place the MR head at a distance of $0.70(TW/4)$ or 17.5% of the TW towards the ID of the disk with respect to an Even track's centerline. This is accomplished by directing the servo-system to make the difference between the Quads signal and the Norms signal equal to zero (i.e., $N-Q=0$) at an Even track. The value of the Norms signal is then obtained after the head has been appropriately positioned. In the preferred embodiment, to obtain a good average value of the Norms signal that eliminates noise, the above step is performed on several tracks and for several revolutions (i.e., several sets of Norms and Quads pairs having the special servo burst pattern). Thus, the third point of the curve has a distance of $K(TW/4)$ towards the inner diameter (ID) and has an average Norms signal at that location. For sake of convenience, the coordinates for the third point will respectively be referred to as $Y_{special}$ and $x_{special}$.

It should be noted that $C_{special}$ and $D_{special}$ bursts could have been written on the other side of the Even track. In such case, the servo-system would be directed to make the aggregate of Norms signal and the Quads signal equal to zero. Furthermore, instead of using $C_{special}$ and $D_{special}$ servo bursts, $A_{special}$ and $B_{special}$ servo bursts could have been used.

Plugging in the values of the three points into equation 1, the following three equations result:

$$Y_{OD}=Ax_{OD}+Bx^2_{OD}+Cx^3_{OD}$$

$$Y_{ID}=Ax_{ID}+Bx^2_{ID}+Cx^3_{ID}$$

$$Y_{special}=Ax_{special}+Bx^2_{special}+Cx^3_{special}$$

Since $Y_{OD}, x_{OD}, Y_{ID}, x_{ID}, Y_{special}$ and $x_{special}$ are known, the equations can be used to solve for the values of coefficients (constants) A, B and C using conventional mathematical techniques such as $n^{th}$ order regression, coefficient averaging or substitution. In fact, in the preferred embodiment, the system's software merely solves the closed end equations using substitution to obtain the values of the coefficients.

After determining the values of the coefficients which are then plugged into equation 1, the inverted Norms curve of FIG. 7 is developed. That curve is then "flipped" to obtain the relatively linear portion of the Norms curve (i.e., that portion from $-TW/4$ to $TW/4$) of FIG. 5 for the particular head used to acquire the three points.

As mentioned above, for distances greater than $TW/4$ away from the Even track centerline, the system is designed to follow the relatively linear section of the Quads curve. Because the Quads curve and the Norms curve are identical in shape but 90 degrees out of phase, the curve developed for the relatively linear section of the Norms curve can be used to create the relatively linear section of the Quads curve as will be understood by those skilled in the art. In cases where the Quads curve is being followed, the system's software automatically adjusts the position of the head 20 ½ track in the appropriate direction so that the head 20 is placed closer to the track centerline.

The so-called PES curve for each head, therefore, consists of the relatively linear portion of the Norms curve for that head for distances less than or equal to TW/4 from the track centerline and consists of the relatively linear portion of the Quads curve for that head for distances greater than TW/4 from the track centerline. After we have determined the PES curve for each head using the technique outlined above, we can then use the measured voltages based upon the head position to determine the distance the head needs to be moved so that it is in line with respect to the track centerline.

It must be noted that the preceding development of the PES curve was performed for an Even track using servo burst patterns only written on Even tracks. Because the slope of the relatively linear section of the Norms curve is positive for an Odd track (see FIG. 4) instead of negative as for an Even track and because the relatively linear section of the Norms curve includes second order effects, certain measures must be taken in developing the PES curve for Odd tracks. Specifically, after the three points have been obtained from the Even calibration tracks, the signs of the points are altered such that points originally in the second quadrant are placed in the third quadrant (and visa-versa) and points originally in the fourth quadrant are placed in the first quadrant (and visa-versa)(i.e., the points are "flipped" across the x-axis of FIG. 7). Once the points have been transferred to their appropriate quadrants, the three values are plugged into the three equations described above to solve for A, B and C. The remainder of the procedures to develop the PES curve mirror those of the Even track PES curve, as will be understood by those skilled in the art.

Referring back to FIG. 6, it must be noted that the special servo burst pattern is written by the STW around one or more entire tracks. Furthermore, more than three equations and, hence, three points may be used to solve for the coefficients of Equation 1. In fact, in the preferred embodiment of the invention, 6 points are used. Those points have distance ordinates of+/−10% of the TW, +/−17.5% of the TW and +/−25% of the TW. Points having distance ordinates +/−10% of TW are chosen because they are useful in developing the portion of the curve near the origin (see FIG. 7). Points having distance ordinates +/−17.5% of TW are chosen because they are near where bends occur (see FIG. 7).

It should be noted that the curve of FIG. 5, may also have $4^{th}$ and $5^{th}$ order effects. Thus, it should be understood that the following technique may be extended to develop a PES curve which includes $4^{th}$, $5^{th}$ or higher order effects (i.e., $n^{th}$ order effects). At this point, however, the ma limitation in developing curves which account for the higher order effects is the computation time required to solve for the coefficients of equations describing such curves.

As will be understood, the technique described above can be applied to each of the MR heads of a disk drive containing a plurality of heads to obtain a relatively linear PES curve for each of the heads.

It should also be understood that instead of only writing the servo calibration patterns on Even tracks, Odd tracks (either individually or in combination with the Even tracks) could also be used.

Finally, it should also be understood that instead of developing a conventional Norms curve, the present invention can also be used in connection with developing curves for groups of servo bursts which are used to position the MR head in a particular location relative to the track centerline. For example, the present invention can be used in connection with developing an N−Q curve or and N+Q curve, among other curves.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A magnetic disk having a servo burst pattern written thereon and a plurality of tracks, each of the tracks having a track width, the servo burst pattern comprising:
   a first servo burst and a second servo burst forming a first servo burst pair; and
   a third servo burst and a fourth servo burst forming a second servo burst pair, the second servo burst pair being circumferentially adjacent to the first servo burst pair, the third servo burst spanning a distance of (TW/2+K(TW/2)) and the fourth servo burst spanning a distance of ((TW/2+(2−K)(TW/2)), where TW equals the track width and 0<K<1.

2. The disk of claim 1 wherein the first servo burst pair spans a distance of two track widths.

3. The disk of claim 1 wherein the first servo burst spans a distance of one track width and the second servo burst spans a distance of one track width.

4. The disk of claim 1 wherein the first servo burst and the second servo burst intersect at a track centerline.

5. The disk of claim 4 wherein the disk has an outer diameter and an inner diameter, the first servo burst being positioned on the outer diameter side of the track centerline and the second servo burst being positioned on the inner diameter side of the track centerline.

6. The disk of claim 4 wherein the third and fourth servo bursts intersect at a distance less than ¼ of the track width away from the track centerline.

7. A method of developing a PES curve for a disk drive including an MR head and a magnetic disk having a servo burst pattern written thereon, the method comprising:
   a. reading the servo burst pattern from the magnetic disk, the servo burst pattern including first and second servo bursts which intersect at a first point, the first and second servo bursts having spans equal to one another, third and fourth servo bursts which intersect each other at a second point, the third servo burst having a span equal to (TW/2+K(TW/2)) and the fourth servo burst having a span equal to ((TW/2+(2−K)(TW/2)), where 0<K<1 and TW is the track width;
   b. centering the MR head at a position radially halfway between the first point and the second point; and
   c. obtaining a reading from the head after it has been centered.

8. The method of claim 7 including the step of determining the position at which the MR head was centered.

9. The method of claim 8 including the step of using the MR head position information and the reading from the head to develop the PES curve.

10. The method of claim 9 including the step of substituting the values of the head position and the reading from the head into an $n^{th}$ order equation containing n coefficients, where n is a whole number.

11. The method of claim 10 including the steps of determining n−1 additional head positions and readings from the head which satisfy the $n^{th}$ order equation and substituting the values of same into the $n^{th}$ order equation.

12. The method of claim 11 including the step of solving for the values of the coefficients.

13. The method of claim 12 wherein the values of the coefficients are solved for using $n^{th}$ order regression.

14. The method of claim 12 wherein the values of the coefficients are solved for using coefficient averaging.

15. The method of claim 12 wherein the values of the coefficients are solved for using substitution.

16. The method of claim 12 wherein the values of the coefficients are used to generate a relatively linear portion of a Norms curve for a particular head.

17. The method of claim 16 wherein a relatively linear portion of a Quads curve is developed from the relatively linear portion of the Norms curve.

18. The method of claim 17 wherein the relatively linear portion of the Norms curve and the relatively linear portion of the Quads curve are used to develop the PES curve.

19. A method of developing a PES curve for a disk drive including a disk and an MR head, the method comprising the steps of:
   providing a servo burst pattern on the disk, wherein the servo burst pattern includes a first servo burst and a second servo burst forming a first servo burst pair and a third servo burst and a fourth servo burst forming a second servo burst pair, the first and second servo burst pairs are circumferentially adjacent to one another, the first and second servo bursts each span a distance, the third servo burst spans greater than the distance and the fourth servo burst spans less than the distance;
   centering the head using the servo burst pattern and obtaining a reading from the head; and
   developing a Norms curve using the first and second servo burst pairs.

20. The method of claim 19 wherein the Norms curve has a relatively linear region.

21. The method of claim 20 wherein the disk includes a plurality of concentric tracks, each of the tracks having a track width.

22. The method of claim 21 wherein the third servo burst spans a distance of (TW/2+K(TW/2)) and the fourth servo burst spans a distance of ((TW/2+(2−K)(TW/2)), where TW equals the track width and 0<K<1.

23. The method of claim 22 wherein the first and second servo burst pairs each span two track widths.

24. The method of claim 23 wherein the first and second servo bursts each span one track width.

25. The method of claim 24 wherein the first and second servo bursts intersect at a track centerline.

26. The method of claim 25 wherein the first servo burst is positioned at and above the track centerline and the second servo burst is positioned at and below the track centerline.

27. The method of claim 25 wherein the third and fourth servo bursts intersect at a distance less than ¼ of the track width from the track centerline.

28. The method of claim 25 including the step of developing a Quads curve from the Norms curve.

29. The method of claim 28 wherein the head follows the Norms curve when the absolute value of the bead from the track centerline is less than ¼ of the track width from the track centerline and the head follows the Quads curve when the absolute value of the distance of the head from the track centerline is greater than ¼ of the track width from the track centerline.

30. The method of claim 28 wherein the head follows the Norms curve when the absolute value of a Norms signal is less than the absolute value of a Quads signal, and the head follows the Quads curve when the absolute value of the Quads signal is less than the absolute value of the Norms signal.

31. The method of claim 28 including the step of using the servo burst pattern to obtain the value of a Norms signal when the head is positioned K(TW/4) from the track centerline .

32. A disk drive comprising:
    a disk having a plurality of tracks, the tracks having a track width;
    a head associated with the disk and capable of reading information written thereon;
    means for positioning the head over the tracks; and,
    a servo burst pattern written on the disk, the servo burst pattern including:
        a first servo burst and a second servo burst forming a first servo burst pair; and,
        a third servo burst and a fourth servo burst forming a second servo burst pair, the second servo burst pair being circumferentially adjacent to the first servo burst pair, the third servo burst spanning a distance of (TW/2+K(TW/2)) and the fourth servo burst spanning a distance of ((TW/2+(2−K)(TW/2)), where TW equals the track width and 0<K<1.

33. The servo burst pattern of claim 32 wherein the first servo burst pair spans a distance of two track widths.

34. The servo burst pattern of claim 32 wherein the first servo burst spans a distance of one track width and the second servo burst spans a distance of one track width.

35. The servo burst pattern of claim 32 wherein the first servo burst and the second servo burst intersect at a track centerline.

36. The servo burst pattern of claim 35 wherein the disk has an outer diameter and an inner diameter, the first servo burst being positioned on the outer diameter side of the track centerline and the second servo burst being positioned on the inner diameter side of the track centerline.

37. The servo burst pattern of claim 35 wherein the third and fourth servo bursts intersect at a distance less than ¼ of the track width away from the track centerline.

38. A method of developing a PES curve for a disk drive including a disk and an MR head, the method comprising the steps of:
    providing a disk with a plurality of tracks each having a track width;
    providing a servo burst pattern on the disk, wherein the servo burst pattern includes first and second servo burst pairs that are circumferentially adjacent to one another, the first servo burst pair includes first and second servo bursts, the second servo burst pair includes third and fourth servo bursts, and each of the first and second servo bursts span a different distance than each of the third and fourth servo bursts;
    centering the head using the servo burst pattern and obtaining a reading from the head and
    developing a Norms curve using the first and second servo burst pairs.

39. The method of claim 38 wherein the first and second servo burst pairs each span a distance.

40. The method of claim 39 wherein the distance is two track widths.

41. The method of claim 38 wherein the first and second servo bursts each span a distance, the third servo burst spans less than the distance and the fourth servo burst spans greater than the distance.

42. The method of claim 41 wherein the distance is one track width.

43. The method of claim 38 wherein the first and second servo bursts are Norms bursts that intersect at a track centerline and the third and fourth servo bursts are Quads bursts that intersect between track centerlines.

44. The method of claim 43 wherein the intersections of the Norms bursts and the Quads bursts are radially separated from one another by less than ¼ of the track width.

45. The method of claim 38 wherein the first and second servo burst pairs each span two track widths and the first and second servo bursts each span one track width.

46. The method of claim 45 wherein the third servo burst spans less than one track width and the fourth servo burst spans greater than one track width.

47. The method of claim 46 wherein the third servo burst spans less than ½ the distance spanned by the fourth servo burst.

48. The method of claim 47 wherein the first and second servo bursts are Norms bursts that intersect at a track centerline and the third and fourth servo bursts are Quads bursts that intersect between track centerlines.

49. The method of claim 48 wherein the intersections of the Norms bursts and the Quads bursts are radially separated from one another by less than ¼ of the track width.

* * * * *